March 18, 1924.
W. M. DECKER
CUSHIONED VEHICLE WHEEL
Filed Dec. 20, 1920
1,486,865
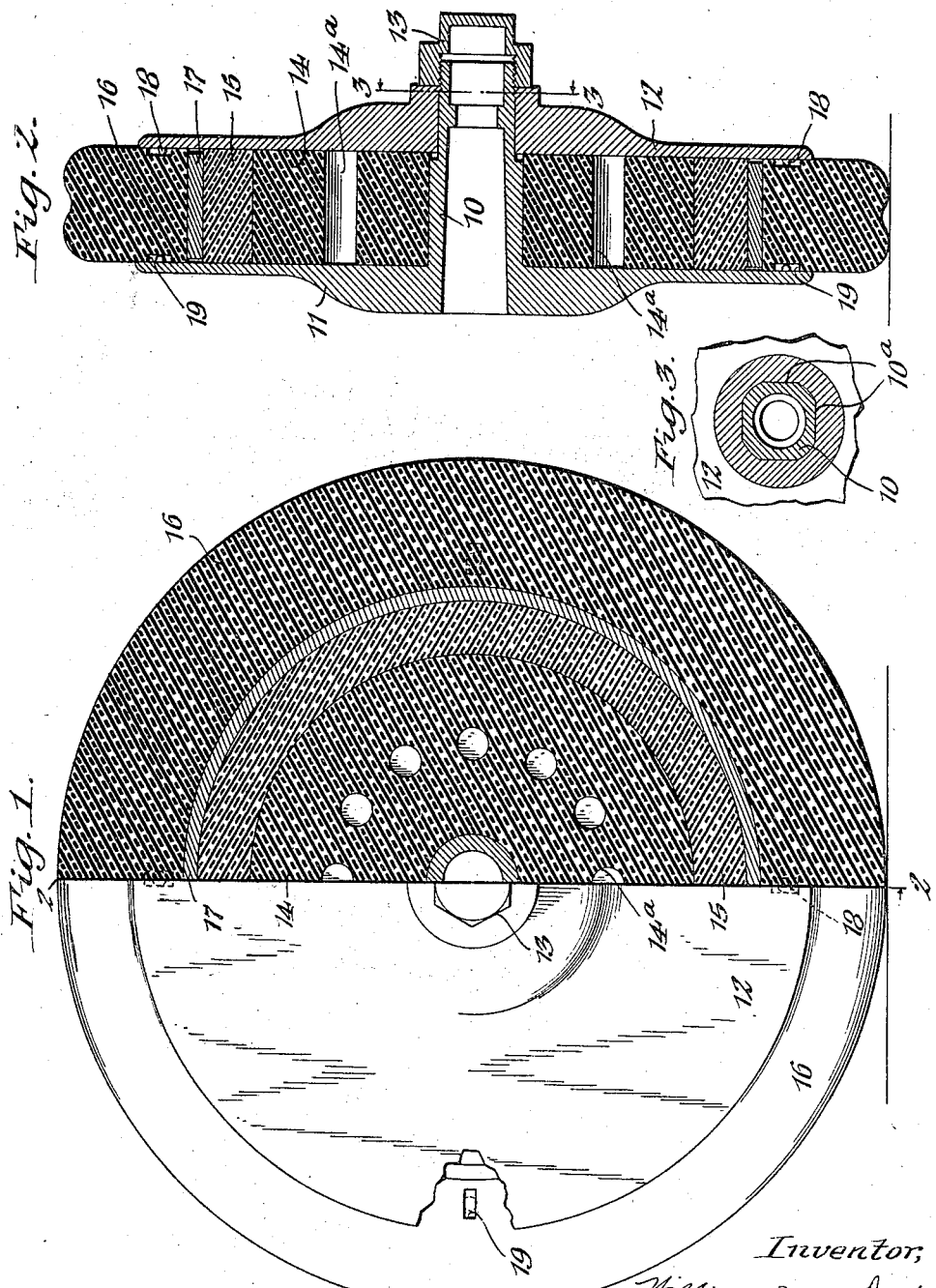

Patented Mar. 18, 1924.

1,486,865

UNITED STATES PATENT OFFICE.

WILLIAM MORE DECKER, OF BUFFALO, NEW YORK.

CUSHIONED VEHICLE WHEEL.

Application filed December 20, 1920. Serial No. 432,001.

*To all whom it may concern:*

Be it known that I, WILLIAM MORE DECKER, a citizen of the United States, residing at Buffalo, in the county of Erie and State of New York, have invented new and useful Improvements in Cushioned Vehicle Wheels, of which the following is a specification.

This invention relates to a resilient vehicle wheel designed more particularly for automobiles and auto-trucks.

Its chief object is the production of a wheel of this character which, while possessing a high degree of resilience is free from the well known objections of wheels having pneumatic tires.

A further object of the invention is to so construct the wheel that its tread-member, when worn out, can be readily renewed without the necessity of replacing other parts of the wheel, thus materially prolonging the life of the wheel and effecting an important saving in this part of the auto equipment.

In the accompanying drawings: Figure 1 is a sectional side elevation of the improved vehicle wheel. Figure 2 is a transverse section on line 2—2, Fig. 1. Figure 3 is a cross section on line 3—3, Fig. 2.

Similar characters of reference indicate corresponding parts in the several views.

The rigid body-portion of the wheel preferably comprises a metallic hub or thimble 10 carrying a pair of spaced parallel disks or flanges 11, 12. One of these disks, say the inner disk 11 may be formed integral with the hub, as shown, while the other disk 12 is removably mounted on the hub and held thereon by a clamping nut 13. This removable disk is held against turning on the hub by providing the latter with two or more flattened sides 10ª which engage a correspondingly-shaped bore of the disk, as shown in Fig. 3, or by any other suitable means. The marginal portions of these disks may be considerably thinner than their central portions, in order to reduce the weight of the wheel to a minimum.

Securely confined and supported between the hub-disks 11 and 12 are one or more circular resilient core members or cushions 14, 15, and a resilient tread-member or ring 16 encircling the same and extending a suitable distance beyond the edges of said disks. In the preferred construction shown in the drawings, two concentric core-members are employed, the inner one 14 being a circular block of relatively hard, unvulcanized rubber and occupying the greater part of the space between the hub and the tread member, while the outer core member 15 is a ring of somewhat softer unvulcanized rubber which may occupy the remainder of that space. To reduce the weight of the inner core block as well as increase its resiliency, it may be provided with one or more rows of transverse perforations 14ª of any suitable size, shape and number. However, these perforations are optional and may be omitted, if desired.

The tread member 16, like the inner core member 14, is preferably made of comparatively hard unvulcanized rubber.

In some cases, a thin resilient band 17 of steel or other appropriate material may be interposed between the tread member and the outer core member 15, to distribute over a greater area of the core members the load or pressure exerted on the tread-member. This band is not essential, however, and may be omitted, if desired. When used, the band is somewhat narrower than the rubber tread and core members to permit them to be compressed and tightly clamped between the hub-disks by the nut 13.

Preferably the soft rubber core member is originally somewhat wider or of greater transverse dimensions than the tread-ring and the inner core member, so that it is compressed between the hub disks in advance of those members and forms a watertight joint which protects the inner core-member.

In a wheel having an over-all diameter, say of thirty-four inches, the inner core-member may be about twenty inches in diameter, the contiguous outer core member about two inches wide radially of the wheel, and the tread-member about five inches from its periphery to its inner edge. To reliably hold the tread-member from displacement, it is clamped between the disks for a radial width of about two inches. I do not however wish to be limited to these relative dimensions, as they may obviously be varied according to the size of the wheel, the load to be borne by it, or other conditions.

To prevent creeping or slippage of the tread-member relatively to the hub-disks 11, 12, upon applying the brake, said section is interlocked with the disks by any suitable means, for example, by providing the disks on their inner sides with one or more lugs or projections 18 which enter corresponding recesses or cavities 19 in the contiguous sides of the tread-member, as shown in Fig. 2. These recesses are preferably elongated radially, as shown in Fig. 1, to permit the tread-member to yield and play in that direction, while compelling it to turn with the disks.

As not only the tread but also its supporting core is resilient, the wheel is thoroughly cushioned, causing a vehicle equipped therewith to ride practically as comfortably as with pneumatic tires. At the same time, the wheel is free from pneumatic parts or cushions of any kind, which are liable to blow out or become punctured, rendering the wheel absolutely reliable and serviceable under all conditions and avoiding the annoyance, delays and expense incident to the use of pneumatic tires.

As the tread-member is separate from the core-members and comparatively narrow from its inner to its outer edge or periphery, it can, when nearly worn down to the hub disks 11, 12, be replaced by a new one at small expense by simply removing the detachable hub-disk and the tread-member and replacing the disk after applying a new tread-member to the wheel. The core-members being protected from the weather as well as contact with the road or pavement, outlast a plurality of tread-members, greatly prolonging the life of the wheel and correspondingly reducing this item of maintenance.

The core member or members may be of greater or less diameter and a greater or less number of them may be employed, according to the desired size of the wheel, the hub disks or flanges being made of corresponding dimensions. But in all cases, the radial width of the tread ring may be relatively small, so as to reduce its cost of renewal to a minimum.

I claim as my invention:

1. A cushioned wheel, comprising a hub carrying spaced disks, a rubber tread-ring held between said disks, an inner core member surrounding said hub, and an outer core member of rubber interposed between said inner core member and said tread-ring, said outer core-member being constructed of softer rubber than said inner core member.

2. A cushioned wheel, comprising a hub carrying spaced disks, a tread ring of resilient material held between said disks, an inner resilient core member surrounding said hub, and an outer core member of resilient material interposed between said inner core-member and said tread-ring, said outer core member being originally of greater transverse dimensions than the inner core member, whereby it forms a water tight joint with the hub-disks to protect the inner core-member.

3. A cushioned wheel, comprising a hub carrying spaced disks, a rubber tread-ring held between said disks, an inner core member of rubber surrounding said hub, an outer core member encircling said inner core-member and constructed of softer rubber than the same, and a resilient metallic band interposed between said tread-ring and said outer core-member.

WILLIAM MORE DECKER.